United States Patent [19]

Chawan et al.

[11] Patent Number: 4,956,190

[45] Date of Patent: Sep. 11, 1990

[54] TEMPERING AND MILLING OF EDIBLE GRAINS AND LEGUMINOUS MATERIALS WITH REDUCING AGENTS AND METHODS OF MAKING ALIMENTARY PRODUCTS

[75] Inventors: Dhyaneshwar B. Chawan, Liverpool; Carleton G. Merritt, Phoenix, both of N.Y.; Radwan H. Ibrahim, Crystal, Minn.

[73] Assignee: Borden, Inc., Columbus, Ohio

[21] Appl. No.: 342,236

[22] Filed: Apr. 24, 1989

[51] Int. Cl.$^5$ .................. H23L 1/16; H23L 1/272
[52] U.S. Cl. ........................ 426/269; 426/262; 426/268; 426/451; 426/460; 426/618; 426/622; 426/634; 241/10
[58] Field of Search ............ 426/268, 269, 451, 460, 426/618, 622, 634, 262; 241/10

[56] References Cited

U.S. PATENT DOCUMENTS

| | | | |
|---|---|---|---|
| 1,222,830 | 4/1917 | Werner | 426/618 |
| 1,957,688 | 3/1931 | Blish | 426/622 |
| 2,947,484 | 8/1960 | Szasz | 241/10 |
| 3,043,699 | 7/1962 | Schandz et al. | 426/622 |
| 3,503,753 | 3/1970 | Dahle | 426/618 |
| 3,725,081 | 4/1973 | Barham | 426/618 |
| 3,762,931 | 10/1973 | Craig et al. | 426/557 |
| 4,335,148 | 6/1982 | Vidal | 426/319 |

OTHER PUBLICATIONS

"Durum Wheat: Chemistry and Technology", edited by G. Fabiani and C. Lintas, published by The American Assocation of Cereal Chemists, Inc., ©1988, at pp. 64–65.
"The Chemistry of Wheat Starch and Gluten and Their Conversion Products", J. W. Knight (Leonard Hill, pub. 1965), at p. 88.

*Primary Examiner*—Donald E. Czaja
*Assistant Examiner*—Evan Federman
*Attorney, Agent, or Firm*—Dennis H. Rainear; Kenneth P. Van Wyck

[57] ABSTRACT

The invention relates to improvements in flour, and pasta produced therefrom, wherein the flour is produced by milling of grains and legumes previously tempered in the presence of a reducing agent. The reducing agent can be, for example, sodium metabisulfite, organic acids, $SO_2$, cysteine, thioglycolic acid, glutathione, or hydrogen sulfide. The presence of the reducing agent in the tempering solution produces an improvement in color retention of the resulting flour, and allows the shorts to separate from the semolina to be remilled to produce flour of color and quality acceptable for use in pasta production.

20 Claims, No Drawings

TEMPERING AND MILLING OF EDIBLE GRAINS AND LEGUMINOUS MATERIALS WITH REDUCING AGENTS AND METHODS OF MAKING ALIMENTARY PRODUCTS

BACKGROUND OF THE INVENTION

Milling of edible materials, such as grains and legumes, is a grinding and particle size reduction operation, generally designed to produce fine, uniform flour for comestible products. Milling separates the bran and germ from the generally more desirable endosperm portion of the grain. Semolina or semolina flour is the flour obtained from the milling of hard wheat such as the middlings of durum wheat. Semolina comprises a major portion of the milled flour in alimentary pastes because it is highly glutinous and produces a self supporting alimentary pasta.

It is known to treat pasta dough, or flour being made into pasta dough, with various modifiers, additives and agents for various purposes including color retention, improved nutritive value and greater pasta yield. For example, U.S. Pat. No. 3,762,931, issued Oct. 2, 1973 to Craig, et al. teaches the addition of edible sulfhydryl reducing substances to alimentary paste for the purposes of reducing moisture content, improving surface characteristics and decreasing drying time of the pasta. Known flour treatment agents include, for example, $KBrO_3$, $KIO_3$, azodicarbonamide ($H_2NC(O)N=N-C(O)NH_2$), chlorine dioxide, chlorine gas, benzoyl peroxide, ascorbic acid, and L-cysteine. Of these flour treatment agents, only ascorbic acid and l-cysteine are reducing agents, while the remainder of the agents are oxidizing agents. To the knowledge of the inventors, reducing agents have not been used to treat edible grains and legumes in the tempering step prior to milling.

In "Durum Wheat: Chemistry and Technology", edited by G. Fabriani and C. Lintas, published by The American Association of Cereal Chemists, Inc., St. Paul, Minn., at pages 64–65, it is taught that the use of oxidation inhibitors, such as L-ascorbic acid, can inhibit the destruction of the yellow color in the processing of semolina.

In the commercial production of semolina, it is conventional to use chlorine gas in the tempering solution prior to milling of durum wheat. The chlorine gas is an oxidant and inhibits mold growth during shipping and storage of the flour produced. However, chlorine may be related to adverse effects on the quality of pasta products produced from the semolina. In addition, chlorine is a toxic gas and creates handling and venting problems in the tempering step.

It is also previously known to use sulfur dioxide as a bleaching agent in corn milling and/or in tempering of corn prior to milling for the purpose of reducing color content.

It is therefore an objective of the present invention to increase the yield of durum flour obtained from the milling of durum wheat by the addition of a reducing agent to the tempering step prior to milling.

It is also an object of the present invention to provide a method of improving color retention in milled edible grains and leguminous materials. It is a further object of the present invention to increase the nutritive value of durum flour in general and of semolina flour in particular obtained from the tempering and milling of durum wheat.

SUMMARY OF THE INVENTION

The invention relates to a method of tempering and milling edible grains and/or leguminous material to produce improvements in the nutritive content, color retention, and yield of edible flour produced thereby. The invention further relates to tempering and milling edible grains or leguminous material to produce a flour comprising: tempering the grains or material in the presence of a reducing agent by contacting the grains or material with the reducing agent in the tempering step; and milling the tempered grains or material to produce a flour. By treating unmilled edible grains and/or leguminous material in a tempering solution containing a sufficient amount of a reducing agent or agents, and subsequently milling the edible material, edible flour is produced which is improved over flour produced when a reducing agent is not present in the tempering solution.

The invention also relates to improved color retention in the semolina fraction obtained from the milling of durum wheat which has been tempered using a reducing agent.

The present invention also relates to a method for improving the yield of high quality, edible flour obtained from wheat whereby the flour retains the desirable grain color comprising the steps of (a) tempering durum wheat in a tempering solution comprising one or more reducing agents; (b) milling the tempered wheat, separating the shorts from the flour produced; (c) milling the shorts to obtain additional flour; and (d) combining the flour from step (b) with the flour from step (c). Additional steps in the method can include, for example, a staged or secondary or tertiary tempering step for the shorts and/or bran, or further milling. The increased yield of edible flour relative to the semolina yield obtained from conventional tempering and milling of wheat is the result of combining the semolina fraction from step (b) and the additional high quality fraction obtained by milling the shorts separated therefrom. By the method of the instant invention, durum flour is produced possessing, relative to conventional flour, improved color retention, reduced visible bran specks, higher protein content, higher mineral content, and high vitamin content.

The present invention also relates to a method for reducing the fractional portion of milled wheat which results in lower quality product, generally sold as animal feed, while simultaneously increasing the fractional portion of the milled wheat which results in high quality edible flour.

The invention further relates to a method for producing pasta comprising: (a) tempering durum wheat in an aqueous tempering solution comprising a sufficient amount of a reducing agent; (b) milling the tempered durum wheat from step (a) to produce an edible flour; (c) mixing the flour from step (b) with water to produce alimentary paste; (d) extruding or sheeting the alimentary paste; and (e) drying the extruded or sheeted alimentary paste to produce a pasta product. Pasta produced from flour made by the instant invention (1) cooks in a shorter time than does pasta produced from conventional flour (i.e. flour product from wheat tempered in the absence of a reducing agent), (2) can be extruded at higher solids levels, (3) retains more of the natural yellow color, and (4) exhibits cooking losses equal to or less than that of pasta made from conventional tempering.

DETAILED DESCRIPTION OF THE INVENTION

In one embodiment of the present invention, edible grains or leguminous materials are tempered in an aqueous tempering solution containing a reducing agent. The edible material can be, for example, wheat, barley, rye, soybean, oats, rice, etc., or mixtures thereof. The preferred edible materials are starchy cereal grains and/or farinaceous substances. The most preferred material is durum wheat. By "tempering" herein is meant any process used to condition the grain or leguminous material to achieve a specific predetermined moisture content. This is often a soaking process wherein the material being tempered absorbs most or all of the tempering solution. By the present invention, the reducing agent is also absorbed by the material being tempered. However, according to the present invention the tempering can also be achieved by atomization of a tempering solution, or by a tempering gas, to which the grain or leguminous material is exposed. By "tempering" herein the inventors also contemplate the dry blending of various grains or legumes with reducing agents or precursors thereto such that the reducing agent or precursor is absorbed by the grain or legumes whose inherent moisture content is sufficient to thereby produce the desired color retention, vitamin retention, and/or increased yield of edible flour or which upon hydration produces such results. In another embodiment, the grain or legumes which have been dry blended with the reducing agent or agents are subsequently exposed to water or steam sufficient to produce the desired increased yield of edible flour or improved color retention or improved vitamin retention.

Tempering of the unmilled material can be achieved according to the present invention by contacting the edible material with, or exposing it to, a sufficient amount of a reducing agent or agents. The reducing agent can be liquid or solid material dissolved or dispersed in an aqueous solution, or a dry solid material mixed with the unmilled material, or a gaseous or vaporous material bubbled or blown over or through the dry material or an aqueous solution thereof, or a combination of these forms.

The tempering of the edible material in the tempering solution can be performed under any desired or conventional conditions depending on the flour properties sought. The duration, pressure, temperature, pH and other variables of the tempering of the edible material can be varied within the skill of the artisan. For example, tempering can be achieved by exposing the edible material to the tempering solution, gas, or solid for periods of several minutes up to several days, and at temperatures ranging from about 33° to about 212° F. In a preferred embodiment, the edible material is durum wheat which is tempered in an aqueous tempering solution containing a reducing agent for up to 6 hours at a temperature of about 50°-70° F.

By "reducing agent" herein is meant any compound, chemical, agent, mixture, or substance which is or which produces a material which is, (a) able to chemically reduce and/or reverse the disulfide crosslinking, R—S—S—R, which can result from the oxidative coupling of two sulfhydryl groups, R—SH, on protein(s), or (b) able to donate electrons as in a chemical reduction reaction.

Particularly effective as reducing agents in the present invention are sodium metabisulfite, $SO_2$ or $SO_2$-generating precursors, or organic acids such as, for example, acetic acid, aspartic acid, chloroacetic acid, cysteine, histidine, thioglycolic acid, lactic acid, and maleic acid.

Also effective as reducing agents in the present invention are the anions of certain inorganic acids such as, for example, sulfurous acid, and nitrous acid, and the like.

The presence of the reducing agent also protects the edible material being tempered from chemical or photo degradation of the natural vitamins and coloring agents, including but not limited to carotenoids (such as beta-carotene), chlorophylls, xanthophylls, and the related lipoxidase-linoleate system. A sulfhydryl reducing agent also plasticizes or otherwise modifies the protein in the outer layers of the grain which produces the flour to thereby facilitate improved flour yields, lower energy consumptions, and increased extrusion rates. The presence of one or more reducing agents in the tempering solution provides a pasta dough extrudable at solids levels higher than pasta dough produced from material tempered in the absence of a reducing agent. This is surprisingly achievable by the viscosity reduction provided to alimentary paste produced by the milling in the presence of a reducing agent. Table I indicates that reduced pasta dough viscosity (measured as 500 Brabender Units, B.U.) is achieved faster when the flour in the dough was tempered in the presence of a reducing agent. Reduction in viscosity of the pasta dough is desirable for increasing production rates, reducing extrusion head pressures, reducing energy expenditures, and allowing extrusion at lower moisture levels. Thus moisture levels at extrusion of, for example, 21-27% by weight instead of 30-31% are achievable which reduces drying time, aids in retention of vitamins, and reduces cooking losses.

TABLE I

| Brabender Farinograph Viscosity Measurements | | |
|---|---|---|
| Reducing Agent in Tempering Water | Amount (ppm) | Time needed to reach 500 B.U., (Minutes) |
| none | | 10:50 |
| Chlorine (Control) | 10 | 11:00 |
| Chlorine (Control) | 100 | 12:00 |
| $K_2S_2O_5$ | 247 | 11:00 |
| | 300 | 8:25 |
| | 351 | 8:50 |
| | 400 | 8:00 |
| | 1083 | 4:50 |
| $H_2SO_3$ | 200 (as $SO_2$) | 9:50 |
| Cystiene | 497 | 7:25 |

B.U. is an arbitrary scale of Brabender Units recorded on a Brabender Farinograph viscometer.

Sulfhydryl compounds are among the effective reducing agents in the present invention. Examples of sulfhydryl reducing agents useful in the process of the present invention include cysteine, water-soluble cysteine salts, such as l-cysteine hydrochloride, hydrogen sulfide and glutathione. Sulfhydryl reducing agents are compounds containing —SH groups or compounds which are capable of initiating reactions which reduce —S—S— bonds in gluten to form —SH groups. Sulfur-containing materials such as the sulfite salts and sulfur dioxide which may not contain a —SH group per se are operative herein as reducing agents if upon exposure to moisture, either liquid or vaporous, a —SH group, such as in sulfurous acid, is produced. Satisfactory reducing agents according to the invention also include compounds related to or homologous with L-cysteine hydrochloride, such as D and DL cysteine hydrochloride, the free bases of L, D and DL cysteine, L-cysteine mono-phosphate, di-L-cysteine sulfite and 1-mono-cysteine tartrate. Various sulfite salts such as potassium bisulfite and sodium or potassium sulfite can be used in place of sodium bisulfite. Related compounds such as hydrosulfite and pyrosulfite salts may also be employed as reducing agents in the tempering process. Natural foods and other sources of the above compounds may also be used herein. Such a natural food source can include, for example, purified wheat germ fraction which contains glutathione.

It is also believed that nitrogen-containing compounds, such as amines, are also operative herein as reducing agents in the tempering solution. Thus, amides, amines, diamines etc. capable of being oxidized to quaternium compounds will, in turn, act as reducing agents in the present invention.

All of these reducing agents are utilized herein in non-toxic amounts and do not form any known toxic or otherwise objectionable by-products with the other materials, if any, in the tempering solution or with the materials mixed with the flour resulting from milling. The reducing agents have no known detrimental effect upon flavor, nutritional value or other essential properties of the milled flour or subsequent food product, such as pasta. The reducing agents may be utilized in the present invention either singularly or in combination.

The amount of reducing agent present in the tempering solution is an amount sufficient to (a) increase the content of retained protein in the edible material after milling relative to protein content in milled material tempered in the absence of a reducing agent and/or (b) increase the color retention in the milled edible material relative to the color of milled material tempered in the absence of a reducing agent, and/or (c) increase the content of retained natural vitamins in the milled material relative to vitamin content of milled material tempered in the absence of a reducing agent, and/or (d) increase the yield of semolina obtained from the milling of durum wheat tempered in a solution containing a reducing agent relative to the yield of edible flour obtained from the milling of durum wheat tempered in the absence of a reducing agent. The amount of reducing agent required in the tempering steps of the present invention varies depending on the agent chosen, its solubility, its redox potential, $E_o$, the pH of the solution and the kind and degree of benefit sought. Thus, pH, pressure and temperature can be conventionally controlled to thereby increase the solubilization and thus the effectiveness of the reducing agent in the tempering solution.

It is believed that increasing the pressure during the tempering step will increase the color content of the resulting flour. Thus pressures of 1-2 atmospheres up to several thousand p.s.i. will either enhance the desired properties or reduce the process time, or both. Reduced pressure during tempering can be effective in certain processes by evacuating a container holding the grain and then introducing the reducing agent or an aqueous solution thereof to the partial vacuum. This will facilitate increased and faster penetration of the reducing agent and the moisture into the grain.

The weight percentage of reducing agent in the tempering solution is generally from about 10 parts per million to about 1000 parts per million. A more preferred range is from about 200 ppm to 400 ppm. When sodium or potassium metabisulfite is used as the reducing agent, an amount effective in color retention according to the present invention has been found to be in the range of from about 100 to about 1000 ppm, and more preferrably from 200 to 500 ppm. Sulfhydryl reducing agents, among which are preferred metabisulfite, cysteine and glutathione, are effective reducing agents in the present invention at levels of 100 ppm to 500 ppm, more preferrably at 200 ppm to 400 ppm.

In achieving the increased yield of high quality, edible flour of acceptable color from durum wheat tempered in the presence of a reducing agent, an effective amount of reducing agent can be, for example, 200 ppm to 400 ppm.

The inventors believe that the presence of the reducing agent(s) serves to plasticize the protein in at least the outer layers of the edible grains and leguminous material. The plasticization of the protein is demonstrated by the viscosity reduction or reduced extrusion pressures which result in increased production rates.

By "plasticizing" the protein herein is meant the softening, loosening, or modification of the protein structure which results from the depolymerization of the gluten. It is believed that the reducing agent(s) plasticizes and solubilizes the protein by disrupting the protein chain shape, which allows the protein to better flow around each discrete starch particle. The result is higher protein extraction in the milled product and a subsequent pasta dough which is softer than conventional dough. As a result, and by the present invention, significant improvements in protein yields of higher functional quality from the milling of the shorts have been achieved due to the use of the reducing agent(s) in the tempering step. The softer dough produced can be extruded at either lower pressures or lower moisture content, or both. (See Table IV.)

By "milling" herein is meant the milling, grinding, bolting, shaping, cutting, crushing, conditioning or particle size reduction of the grain or leguminous material. Milling herein can be accomplished by conventional means, such as a ball mill, a Brabender mill, a two roll mill, a three roll mill, rotary mill, and the like.

By "edible flour" herein is meant the flour obtained from the milling of durum wheat, including but not limited to semolina flour. Semolina is the food prepared by grinding and bolting cleaned durum wheat to such fineness that when tested by the method prescribed in 21 CFR section 137.300(b)(2), it passes through a No. 20 sieve, but not more than 3 percent passes through a No. 100 sieve. The semolina is freed from bran coat or bran coat and germ to such extent that the percent of ash therein, calculated to a moisture-free basis, is not more than 0.92 percent. Durum flour has not less than 98 percent passing through the No. 70 sieve. The present invention, however, is not limited to semolina flour and is operative for flours obtained from the tempering and milling of various grains and legumes as described herein.

In conventional milling of durum wheat, several fractions are obtained. The highest value fraction is generally semolina, representing roughly 60% by weight of the milled product. The 40% by weight of the milled product which remains contains a fraction often referred to as "shorts" or bran, which is generally of such color quality and nature that most of it is sold as low value animal feed. The shorts generally include the germ, fine bran and some flour. Conventional chlorine tempering and milling techniques, however, do not render the shorts serviceable as flour for pasta production. A significant feature of the present invention is the ability to recover from the animal feed fraction of the milled product a substantial additional yield of edible flour of sufficient quality to be serviceable in pasta products.

In 1985, the relative values of the semolina fraction to animal feed fraction derived from durum wheat was $10.25 per 100 pounds for semolina to $2.27 per 100 pounds for animal feed. Thus, semolina is clearly a much higher value-added fraction of the milled durum wheat.

By the present invention, milling of durum wheat which has been tempered in a solution containing a reducing agent, such as sodium metabisulfite, produces a yield of edible flour of approximately 75 to about 80% by weight while reducing the fraction of milled product which goes into animal feed. Using conventional chlorine tempering of wheat, it is common to produce approximately 58% by weight semolina suitable for use in pasta. Using conventional chlorine tempering and collecting the so-called "straight grade", i.e., whole grain milled to get maximum yield by combining the semolina and the shorts, approximately 78.5% by weight flour is obtained. However, this flour is not acceptable for commercial pasta because of color and texture. However, by the present invention 78.5% by weight edible flour suitable for pasta is produced by combining the flour milled the shorts with the semolina. The increased edible flour yield relative to conventional tempering and milling is the result of combining the semolina fraction and an additional high quality fraction obtained by milling the shorts separated therefrom. Thus by the present invention, the yield of high quality edible flour from the milling of durum wheat tempered in a solution with a reducing agent is approximately 16-20% higher than the conventional yield of semolina alone from durum wheat tempered in the absence of a reducing agent.

Table II shows the total yield of edible flour obtained by the present invention in laboratory experiments when combining the flour from the milling of the shorts with the semolina fraction. In the control sample of Table II, no reducing agent was used in the tempering water. The total yield in that sample was 76.7% but the flour thus obtained was significantly inferior to the quality of the inventive sample.

TABLE II

Laboratory Tempering & Milling Of Wheat

| Reducing Agent | Amount, ppm | Total Flour Yield | Color Retention mg/100 g as B-carotene | Pasta Quality |
|---|---|---|---|---|
| none | — | 76.7 | 2.51 | — |
| $H_2SO_3$ | 200 $SO_2$ | 79.74 | 2.514 | + |
| Cystiene-HCl | 200 | 77.8 | 2.552 | + |
| $K_2S_2O_5$ | 1083 | 76.7 | 2.565 | + |
| Cysteine-HCl | 767 | 78.8 | 2.640 | + |
| $SnCl_2$ | 1100 | 78.2 | 2.622 | + |
| $K_2S_2O_5$ | 351 | 76.1 | 2.659 | + |
| ascorbic acid | 550 | 75.2 | 2.615 | + |
| $SnCl_2$ | 1410 | 75.8 | 2.603 | + |
| $K_2S_2O_5$ | 447 | 77.1 | 2.565 | + |
| $K_2S_2O_5$ | 247 | 76.0 | 2.539 | + |
| glutathione | 960 | 76.3 | 2.596 | + |

In a mill trial, a value of 3.671 mg Betacarotene/100 gms. of semolina was obtained after tempering the wheat with $SO_2$. This represents virtually 100% color retention. The same mill trial using chlorine in the tempering step produced semolina with at best 3.020 mg Betacarotene/100 gm.

The additional flour fraction obtained from the milling of the shorts by the present invention is of high food quality because of the desirable color retention, high protein, vitamin and mineral content. The additional fraction obtained thereby is highly suitable for pasta production. Vitamins are generally concentrated in the aleurone or outer part of the grain beneath the bran. This high protein source is generally lost into the shorts and, by conventional technology, would pass to the animal feed fraction. By the present invention, this valuable fraction can be remilled without increasing the ash content significantly, without significant color loss and without destroying the protein. By tempering in the presence of a reducing agent, the protein in the grain is modified but not destroyed. The flour obtained from the milling of the shorts by the present invention has protein level of about 17% as compared to 13-14% protein of semolina obtained after tempering durum wheat with chlorine. By the present invention, vitamin and mineral content is at least comparable to that obtained by chlorine tempering, and the sulfhydryl tempering does not result in poor texture of pasta produced therefrom.

The invention further relates to a method for improving the yield of durum flour obtained from the tempering and milling of durum wheat comprising the steps of: (a) tempering durum wheat in an aqueous tempering solution comprising a reducing agent; (b) milling the tempered wheat from step (a) to produce flour; (c) separating the shorts from the flour obtained in step (b) and passing the shorts through a mill such as, but not limited to a Brabender mill, whereby the shorts receive further grinding or bolting to thereby produce an additional amount of flour. The flour recovered from the milling, grinding or bolting of the shorts can be combined with the flour from step (b) to thereby increase the total yield of edible flour. This invention thus represents a significant cost savings to millers and/or flour converters by increasing the yields of edible flour with color and protein acceptable for pasta production, by 16% to 20%.

The invention further relates to a method for reducing the ash content of the flour produced. By treating the tempered wheat with water, with or without a reducing agent, immediately prior to milling and following tempering, the bran is maintained as soft and less friable whereby the ash content is minimized. Thus the wheat can be twice or thrice tempered to further improve the color retention and reduce the ash content. Such multiple tempering steps can occur at various times prior to the milling sequence.

The invention also relates to a method for increasing the color retention in semolina by tempering the durum wheat in the presence of a reducing agent. In this manner, close to 100% of the color of the durum wheat is maintained in the semolina, as measured by the AOCC 1250 method, Edition 1964.

By the present invention, straight grade is obtained which when used in spaghetti makes a pasta with improved texture relative to the pasta produced from semolina obtained from tempering with chlorine. Thus Table III illustrates the results of subjective texture analyses by trained test panelists, wherein the pasta produced from $K_2S_2O_5$—tempered wheat was given a value of 4.5 on a scale 1 poor—5 good while chlorine tempered wheat produced lower quality pasta textures.

TABLE III

| Spaghetti Produced From Tempered Wheat | | | |
|---|---|---|---|
| Tempering Agent | Amount, ppm | Product | Texture |
| $Cl_2$ | 200 | semolina | 3.5 |
| $Cl_2$ | 200 | straight grade | 4.0 |
| $K_2S_2O_5$ | 400 | straight grade | 4.5 |

In the production of pasta (spaghetti and elbow macaroni) from chlorine tempered wheat and $SO_2$ tempered wheat, the inventive product has higher yields per unit time, lower extrusion pressures measured at the diehead, and consumes less energy. Table IV illustrates the results of the pasta production by the inventive $SO_2$ tempering compared to conventional chlorine tempering.

TABLE IV

| Production Runs Of Pasta From Straight Grade | | | | |
|---|---|---|---|---|
| | $Cl_2$ tempered Spaghetti/ Elbow Mac. | | $SO_2$ tempered Spaghetti/Elbow Mac. | |
| Pounds product/hr., 12% $H_2O$ | 4859 | 3282 | 5029 | 3799 |
| Average diehead pressure, bars | 102 | 123 | 96 | 130 |
| Average amps/trial | 209 | — | 190 | — |

The following Example is provided to further demonstrate and illustrate the invention. In the Example and throughout the specification, all temperatures are expressed in degrees Farenheit unless otherwise indicated. The Example is not to be viewed as a limitation of the invention, as it is contemplated that modifications will readily occur to those skilled in the art, which modifications are within the spirit of the invention and the scope of the appended claims.

EXAMPLE 1

FLOUR RETENTION

Clean durum wheat, 500 grams, at 13.1% by weight moisture was tempered to 16% moisture by spraying a mix of 15.52 grams of water and 1.725 grams of sulfurous acid reducing agent into a Colton rotating drum containing the wheat. The water and reducing agent was sprayed in a fine mist onto the wheat while the wheat was continuously tumbled in the rotating drum. After 4–5 minutes, the spraying was completed and the wheat was transferred to a clean glass jar, sealed, and held at 72°–73° F. for one hour. The wheat was then milled 15 minutes using a Chopin Model CD-1 flour mill according to conventional milling practice. This removed the bran from the wheat and two fractions of wheat were obtained. The two fractions obtained were the coarse semolina and break flour. The course semolina was sifted through a #20 and a #30 seive, then milled into flour by passing through reduction rolls, then sifted through a number 70 seive (160 microns). The fractions not passing through the number 70 seive (160 microns) were collected as shorts and remilled. The fraction which did not pass through the #20 seive was bran which was separated out and not used. In this manner were produced final shorts, wheat flour, plus the prior break flour fraction. This represents conventional milling technique but by means of the reducing agent in the tempering solution, the quality of the flour produced from the shorts is significantly improved.

What is claimed is:

1. A method for producing an alimentary paste comprising:
   (a) tempering edible grains or leguminous material in the presence of a reducing agent selected from the group consisting of sulfhydryl substances, hydrogen sulfide, sulfur dioxide, cysteine, glutathione, and the alkali salts of sulfite, bisulfite, and metabisulfite; by contacting the grains or material with the reducing agent;
   (b) milling the tempered grains or material to produce a flour; and
   (c) mixing the flour with water to produce an alimentary paste.

2. The method of claim 1 wherein the edible grains or leguminous material is selected from the group consisting of wheat, barley, rye, soy bean, oats, and rice.

3. The method of claim 1 wherein the edible grains or leguminous material is a farinaceous cereal grain.

4. The method of claim 1 wherein the edible grain or leguminous material is durum wheat.

5. The method of claim 1 wherein the edible sulfhydryl substances useful as reducing agents are selected from the group consisting of cysteine, cysteine hydrochloride, sulfur dioxide, hydrogen sulfide, glutathione, thioglycolic acid, and mixtures thereof.

6. The method of claim 1 wherein the reducing agent is dissolved or suspended in a tempering solution to which the edible grain or leguminous material is exposed.

7. The method of claim 1 wherein the reducing agent is a gas or vapor bubbled through a tempering solution containing the edible grain or leguminous material.

8. The method of claim 1 wherein the reducing agent is added to the edible grain or leguminous material at a level equal to or greater than 10 parts per million.

9. The method of claim 1 wherein the tempering of step (a) is continued for a period of time and at a temperature and at a pressure sufficient to preserve in the flour produced in step (b) the color of the edible grains or leguminous material.

10. The method of claim 1 wherein the milling of step (b) comprises passing the tempered material obtained from step (a) through at least one particle reducing device, whereby flour is produced.

11. The method of claim 1 wherein the reducing agent is added to a tempering solution as a powdered solid.

12. The method of claim 1 wherein the reducing agent is at least partially dissolved in water to form a reducing agent solution, which solution is added to a tempering solution containing the edible grain or leguminous material.

13. The method of claim 1 wherein the tempering is done in a vessel having a positive or negative pressure.

14. A method of improving color retention in alimentary pasta products produced from milled wheat comprising:
   (a) tempering wheat in a tempering solution comprising a reducing agent selected from the group consisting of sulfhydryl substances, hydrogen sulfide, sulfur dioxide, cysteine, glutathione, and the alkali salts or sulfite, bisulfite, and metabisulfite;
   (b) milling the tempered wheat to produce a flour, which has retained a significant amount of the color of the wheat;
   (c) mixing the flour with water to produce an alimentary paste; and (d) shaping and drying the alimentary paste to form a pasta product.

15. The method of claim 14 wherein the flour is semolina.

16. A method for improving the yield of edible flour with acceptable color retention from the tempering and milling of durum wheat comprising the steps of:
    (a) tempering the durum wheat in a tempering solution comprising a reducing agent selected from the group consisting of sulfhydryl substances, hydrogen sulfide, sulfur dioxide, cysteine, glutathione, and the alkali salts of sulfite, bisulfite, and metabisulfite;
    (b) milling the tempered wheat from step (a) to produce edible flour;
    (c) separating the shorts from the edible flour obtained in step (b) and passing the shorts through a mill whereby the additional flour obtained thereby has improved color retention, and higher vitamin content, higher protein content, relative to flour obtained from milling shorts derived from durum wheat tempered in the absence of the reducing agent.

17. A method for producing pasta comprising:
    (a) tempering wheat in a tempering solution comprising a reducing agent selected from the group consisting of sulfhydryl substances, hydrogen sulfide, sulfur dioxide, cysteine, glutathione and the alkali salts of sulfite, bisulfite, and metabisulfite;
    (b) milling the tempered wheat from step (a) to produce flour;
    (c) mixing the flour from step (b) with water to produce an alimentary paste;
    (d) extruding or sheeting the alimentary paste; and
    (e) drying the alimentary paste to produce a pasta product.

18. A method for producing pasta comprising:
    (a) tempering wheat in a tempering solution comprising a reducing agent selected from the group consisting of edible sulfhydryl substances, hydrogen sulfide, sulfur dioxide, cysteine, glutathione, and the alkali salts of sulfite, bisulfite, and metabisulfite;
    (b) milling the tempered wheat from step (a) to produce edible flour;
    (c) separating the shorts from the flour obtained in step (b);
    (d) passing the shorts from step (c) through a mill whereby an amount of improved flour is recovered whereby the additional flour obtained has improved color retention, and higher vitamin content, relative to flour obtained from milling shorts derived from durum wheat tempered in the absence of the reducing agent;
    (e) combining the flour from step (b) and the improved flour from step (d) with water to produce an alimentary paste;
    (f) extruding or sheeting the alimentary paste; and
    (g) drying the extruded or sheeted alimentary paste to produce a pasta product.

19. The method of claim 16 wherein the reducing agent is present in the tempering solution at a level sufficient to produce from the milling of the shorts a flour fraction essentially equal in color to that of the flour produced in step (b).

20. The method of claim 1 wherein the temperature during the tempering step is 33° F. and wherein the pressure is above one atmosphere.

* * * * *